(12) United States Patent
Chern et al.

(10) Patent No.: US 10,386,614 B2
(45) Date of Patent: *Aug. 20, 2019

(54) OPTICAL APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,910

(22) Filed: Oct. 14, 2015

(65) Prior Publication Data

US 2016/0124195 A1 May 5, 2016

(30) Foreign Application Priority Data

Oct. 31, 2014 (TW) .............................. 103137847 A
Aug. 28, 2015 (CN) .......................... 2015 1 0541106

(51) Int. Cl.
| G02B 17/00 | (2006.01) |
| G02B 13/00 | (2006.01) |
| G02B 13/16 | (2006.01) |
| G02B 3/00 | (2006.01) |
| G02B 5/20 | (2006.01) |

(52) U.S. Cl.
CPC ....... G02B 13/0055 (2013.01); G02B 3/0043 (2013.01); G02B 3/0062 (2013.01); G02B 3/0068 (2013.01); G02B 13/009 (2013.01); G02B 13/0085 (2013.01); G02B 13/16 (2013.01); G02B 5/208 (2013.01)

(58) Field of Classification Search
CPC ...... G02B 3/00; G02B 3/0006; G02B 3/0037; G02B 23/00; G02B 23/02; G02B 23/16; G02B 23/24; G02B 23/2407; G02B 26/00; G02B 26/08; G02B 26/0875
See application file for complete search history.

(56) References Cited

U.S. PATENT DOCUMENTS

| 7,376,314 B2 * | 5/2008 | Reininger | G02B 6/06 385/116 |
| 7,477,451 B2 * | 1/2009 | Katz | G02B 3/0037 359/399 |
| 7,538,956 B2 * | 5/2009 | Toyoda | G02B 13/06 348/36 |
| 7,974,015 B2 * | 7/2011 | Toyoda | G02B 13/06 359/711 |

(Continued)

Primary Examiner — Thong Q Nguyen
(74) Attorney, Agent, or Firm — Muncy, Geissler, Olds & Lowe, P.C.

(57) ABSTRACT

An optical apparatus includes plural optical lens groups with a specified field of view and an optical sensor accommodated and fixed within a casing. After a light beam passes through any of the plural optical lens groups, its travelling direction is changed, and it is sensed by the optical sensor and converted into an image signal by the optical sensor. The optical apparatus has a single optical lens module of minimized volume and is able to implement different optical functions simultaneously. Consequently, the fabricating cost of the optical apparatus is reduced, the assembling process is simplified, and the number of components to be assembled is reduced.

9 Claims, 4 Drawing Sheets

(56) References Cited

U.S. PATENT DOCUMENTS

| | | | |
|---|---|---|---|
| 2005/0253951 A1* | 11/2005 | Fujimoto | H04N 5/2253 |
| | | | 348/335 |
| 2012/0113276 A1* | 5/2012 | Van Arendonk | H04N 5/2253 |
| | | | 348/207.99 |
| 2012/0147228 A1* | 6/2012 | Duparre | H04N 9/045 |
| | | | 348/262 |
| 2012/0268643 A1* | 10/2012 | Imamura | H04N 5/332 |
| | | | 348/335 |
| 2013/0188068 A1* | 7/2013 | Said | G03B 35/08 |
| | | | 348/218.1 |
| 2016/0332904 A1* | 11/2016 | Sannokyou | C03B 7/14 |

\* cited by examiner

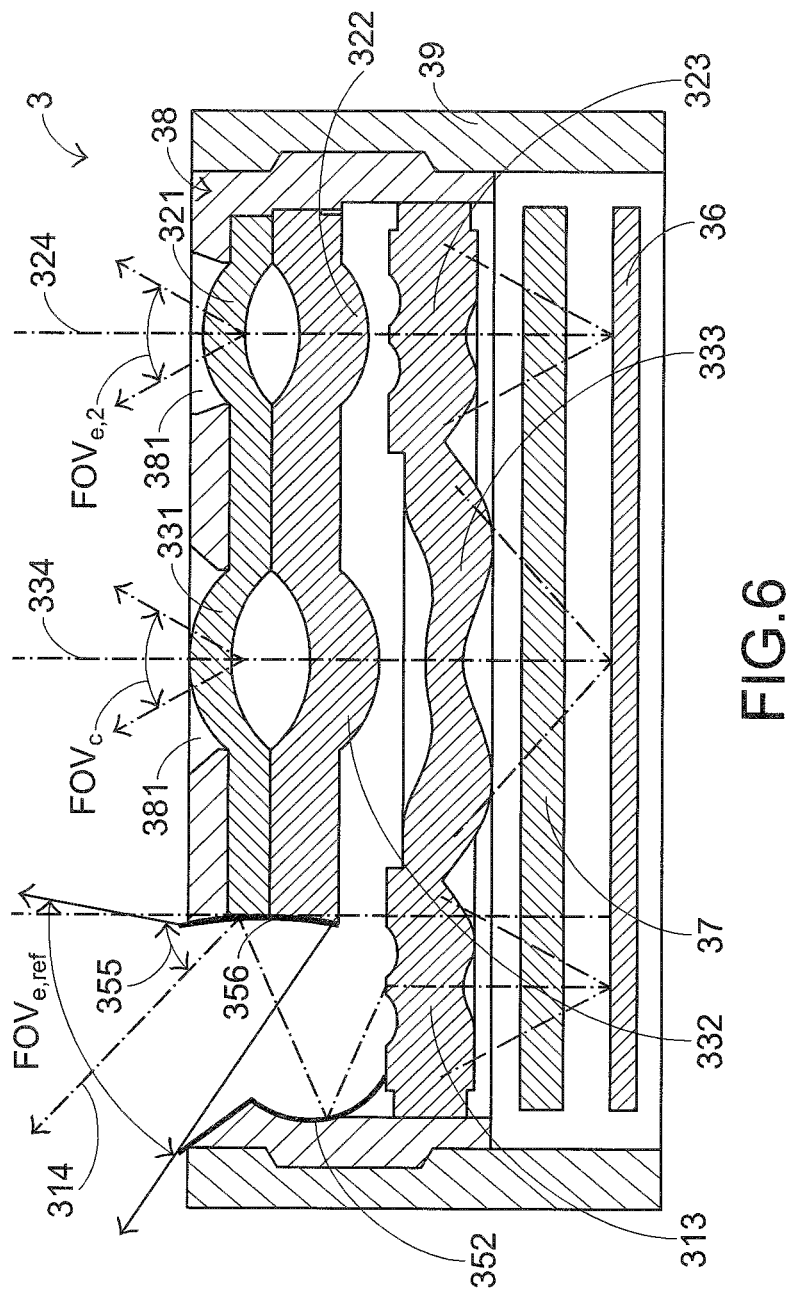

OPTICAL APPARATUS

FIELD OF THE INVENTION

The present invention relates to an optical apparatus, and more particularly to an optical image capturing apparatus with extension functions of wider fields of view (FOV) and/or simultaneous images taking with many FOVs.

BACKGROUND OF THE INVENTION

FIG. 1 schematically illustrates the structure of a conventional image capturing unit. As shown in FIG. 1, the image capturing unit 1 comprises an optical lens group 11, an image sensor 12 and a casing 13. The optical lens group 11 comprises at least one lens for allowing an ambient light beam to pass through. After the light beam passing through the optical lens group 11 is sensed by the image sensor 12, the light beam is converted into an image signal by the image sensor 12. According to the image signal, a corresponding image is shown on a display device. The optical lens group 11 and the image sensor 12 are accommodated within the casing 13 and securely positioned in the casing 13. Consequently, the optical lens group 11 and the image sensor 12 can be normally operated. In FIG. 1, the individual image capturing unit 1 is shown. However, since the current optical technology is increasingly developed, the image capturing unit 1 can be minimized and installed in a portable electronic communication product. It is nevertheless that this traditional image capturing unit is with a specified field of view, unless a zoom lens group is utilized.

Moreover, the image capturing unit 1 of FIG. 1 is able to capture a single image in each capturing process. For solving this drawbacks, plural image capturing units 1 are combined together in order to capture plural images at the same time.

FIG. 2 schematically illustrates the structure of a conventional array-type image capturing apparatus. As shown in FIG. 2, the array-type image capturing apparatus 2 comprises a frame 21 and plural image capturing units 1. The plural image capturing units 1 are in an array arrangement and in a rectangular distribution through the frame 21. Moreover, the image signals corresponding to the images acquired by the plural image capturing units 1 are transmitted to a back-end processor (not shown). After the image signals are integrated and processed by the back-end processor, the integrated image is shown on a display device.

Generally, the array-type image capturing apparatus 2 is able to capture plural images in each capturing process. However, the optical functions provided by the plural image capturing units 1 are identical. For example, the optical axes of the plural image capturing units 1 are along the same direction. That is, there is no inclined angle between any two optical axes. Alternatively, all image capturing units 1 have the same field of view (FOV). Because of fabrication the array lens groups are with the same effective focal length (efl) generally.

Due to the limitations of the fabricating process of the current array-type image capturing apparatus 2, the imaging quality of the image capturing unit 1 is usually insufficient. For example, the image capturing unit 1 usually has a resolution of 1M~2M pixels. Under this circumstance, the function provided by the array-type image capturing apparatus 2 is limited. Moreover, since the array arrangement of the array-type image capturing apparatus 2 is complicated and plural image capturing units 1 are contained in the array-type image capturing apparatus 2, the applications thereof are restricted because of the high cost.

FIG. 3 schematically illustrates the structure of another conventional image capturing apparatus. As shown in FIG. 3, the image capturing apparatus 9 comprises plural lens modules 91 and a casing 92. The lens modules 91 are fixed by the casing 92. Each lens module 91 comprises an optical lens group 911 and an optical sensor (not shown). Moreover, the image signals corresponding to the images acquired by the plural lens modules 91 are transmitted to a processor (not shown). The processor may be built in the casing 92. After the image signals are integrated and processed by the processor, a three-dimensional image is produced or shown on a display device. Likewise, the image capturing apparatus 9 is able to capture plural images in each capturing process. However, since plural optical sensors are installed within the casing 92, the volume reduction of the image capturing apparatus 9 is not obvious.

Therefore, while both of the overall volume and the fabricating cost are taken into consideration, it is an important issue to allow the image capturing apparatus to capture plural images in each capturing process and allow the image capturing apparatus to flexibly provide different optical functions to achieve required optical efficacy according to the practical requirements. Particularly if different FOV is demanded, then it is necessary to embed different views (lens groups) with different FOV for different lens groups. The advantages of the inclusion of more FOV are nontrivial. Effectively, it can play a simultaneous zooming effect since different fields of views, hence different zooming, are taking simultaneously.

SUMMARY OF THE INVENTION

For solving the drawbacks of the conventional technology, an optical apparatus is provided to include a single optical lens module of different optical functions for reduction of the overall volume of the optical apparatus and the fabricating cost, as well as the simplification of assembly process with less components.

Accordingly, an optical apparatus, such as an optical image capturing apparatus, includes a casing accommodating plural optical lens groups and an optical sensor. After a light beam passes through any of the optical lens groups, a travelling direction of the light beam is changed. After the light beam passes through at least one of the lens groups and then is sensed by the optical sensor.

In an embodiment, the plural optical lens groups includes plural peripheral optical lens groups around a center optical lens group. An inclined angle between a center optical axis of the center optical lens and a peripheral optical axis of one of the peripheral optical lens groups may be smaller than 20 degrees, or more than 20 degrees with the help of a reflective optical element embedded into the one peripheral optical lens group.

In an embodiment, the optical apparatus satisfies a mathematic formula:

$$0.2 < \frac{FOV_{e,j}}{FOV_c} < 3$$

wherein $FOV_c$ is a field of view of the center optical lens group, and $FOV_{e,j}$ is a field of view of a j-th peripheral optical lens group.

In an embodiment, the optical apparatus satisfies mathematic formulae:

$$0.6 < \frac{f_c}{f_{e,j}} < 1.2;$$

and $$\frac{f_c}{F/\#} < 2.5 \text{ (mm)}$$

or $$\frac{f_c}{F/\#} < 1.1 \text{ (mm)}$$

wherein $f_c$ is an effective focal length of the center optical lens group, $f_{e,j}$ is an effective focal length of a j-th peripheral optical lens group, and F/# is a f-number of the center optical lens group.

In an embodiment, the optical apparatus satisfies mathematic formulae:

$$0.2 < \frac{f_c}{f_{e,j}} < 2.0;$$

and $$\frac{f_c}{F/\#} < 1.1 \text{ (mm)}$$

In an embodiment, the plural optical lens groups include a first optical lens group with a first optical axis and a second optical lens group with a second optical axis which may be integrally formed together, and the first optical axis and the second optical axis are not overlapped with each other.

In an embodiment, plural optical lens groups include a visible optical lens group for visible light beam and an invisible optical lens group for invisible light beam.

In an embodiment, at least one filter may be further provided to be arranged between the plural optical lens groups and the optical sensor, and a portion of the light beam is filtered and sieved by the filter after passing through the any optical lens group. The filter may block visible light, infrared light, near infrared light and/or far infrared light.

In an embodiment, a light shielding plate may be provided to be located at front sides of the optical lens groups and have plural perforations corresponding to the plural optical lens groups.

In an embodiment, each of the plural optical lens groups includes a single lens or plural lenses in a stack arrangement, wherein each lens is made of plastic, glass or silicon-based material.

Accordingly, the optical lens groups of the optical apparatus are provided to perform different optical functions, such as wide-angle imaging, non-wide angle imaging, long-distance imaging and short-distance imaging functions. Moreover, the optical lens groups are accommodated in the same casing to share the same optical sensor. Consequently, the optical apparatus of the present invention has a single optical lens module able to implement different optical functions simultaneously, such as acquiring plural images corresponding to different optical functions in each capturing process.

The above objects and advantages of the present invention will become more readily apparent to those ordinarily skilled in the art after reviewing the following detailed description and accompanying drawings.

BRIEF DESCRIPTION OF THE DRAWINGS

FIG. 6 is a schematic cross-sectional view illustrating a portion of the optical apparatus of FIG. 4 and taken along the line L-L for another embodiment in accordance with the present invention.

DETAILED DESCRIPTION OF THE PREFERRED EMBODIMENT

Figure 1:
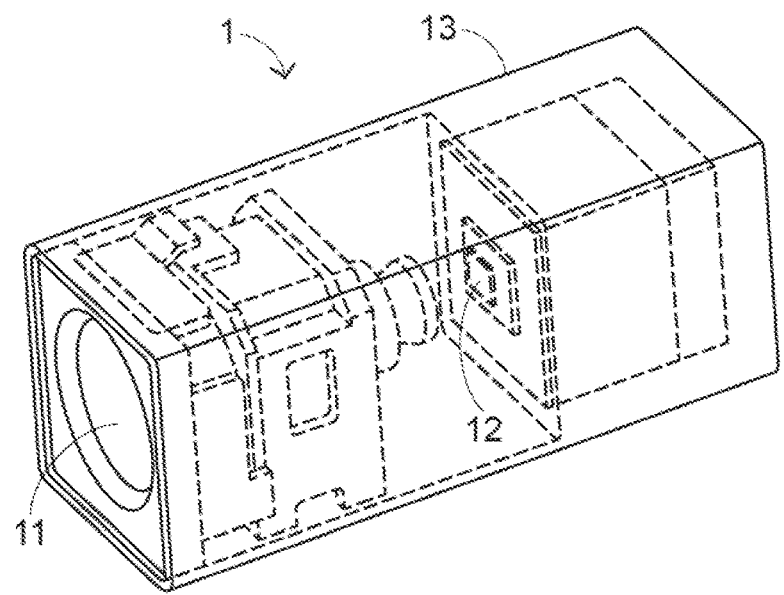
FIG. 1 schematically illustrates the structure of a conventional image capturing unit.
Figure 2:
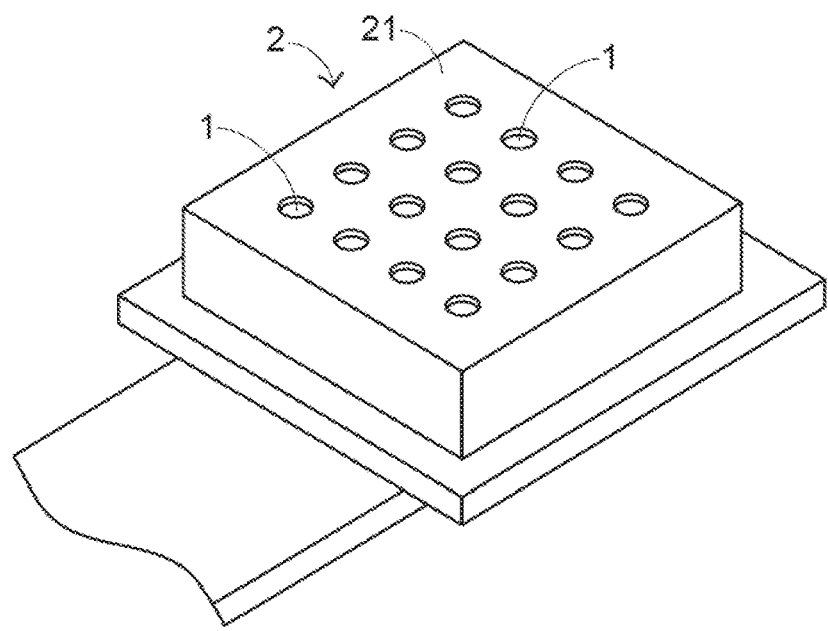
FIG. 2 schematically illustrates the structure of a conventional array-type image capturing apparatus.
Figure 3:
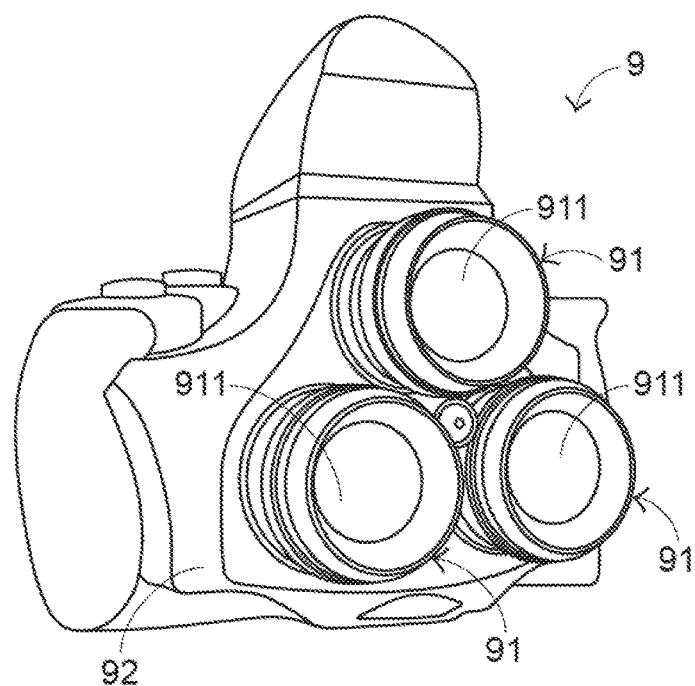
FIG. 3 schematically illustrates the structure of another conventional image capturing apparatus.
Figure 4:
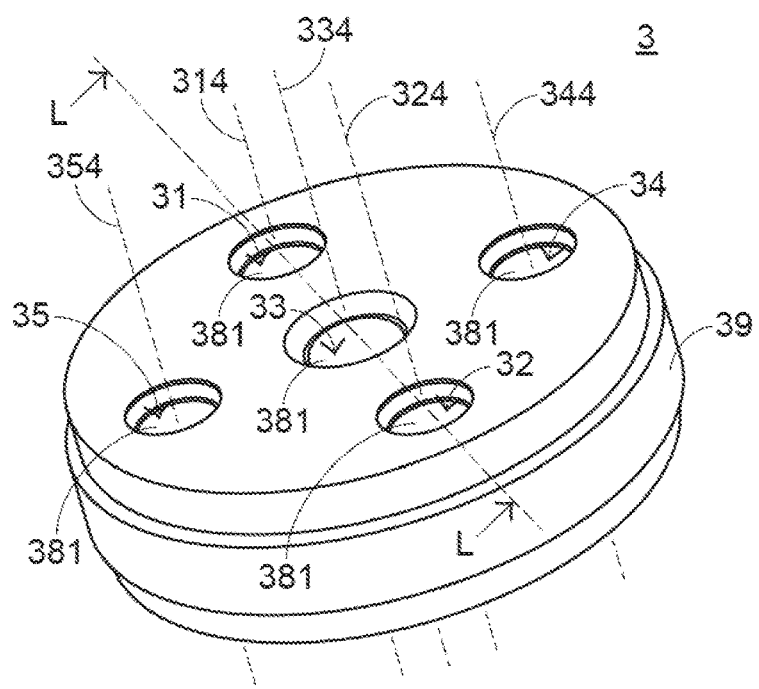
FIG. 4 is a schematic perspective view illustrating the outer appearance of an optical apparatus according to an embodiment of the present invention.
Figure 5:
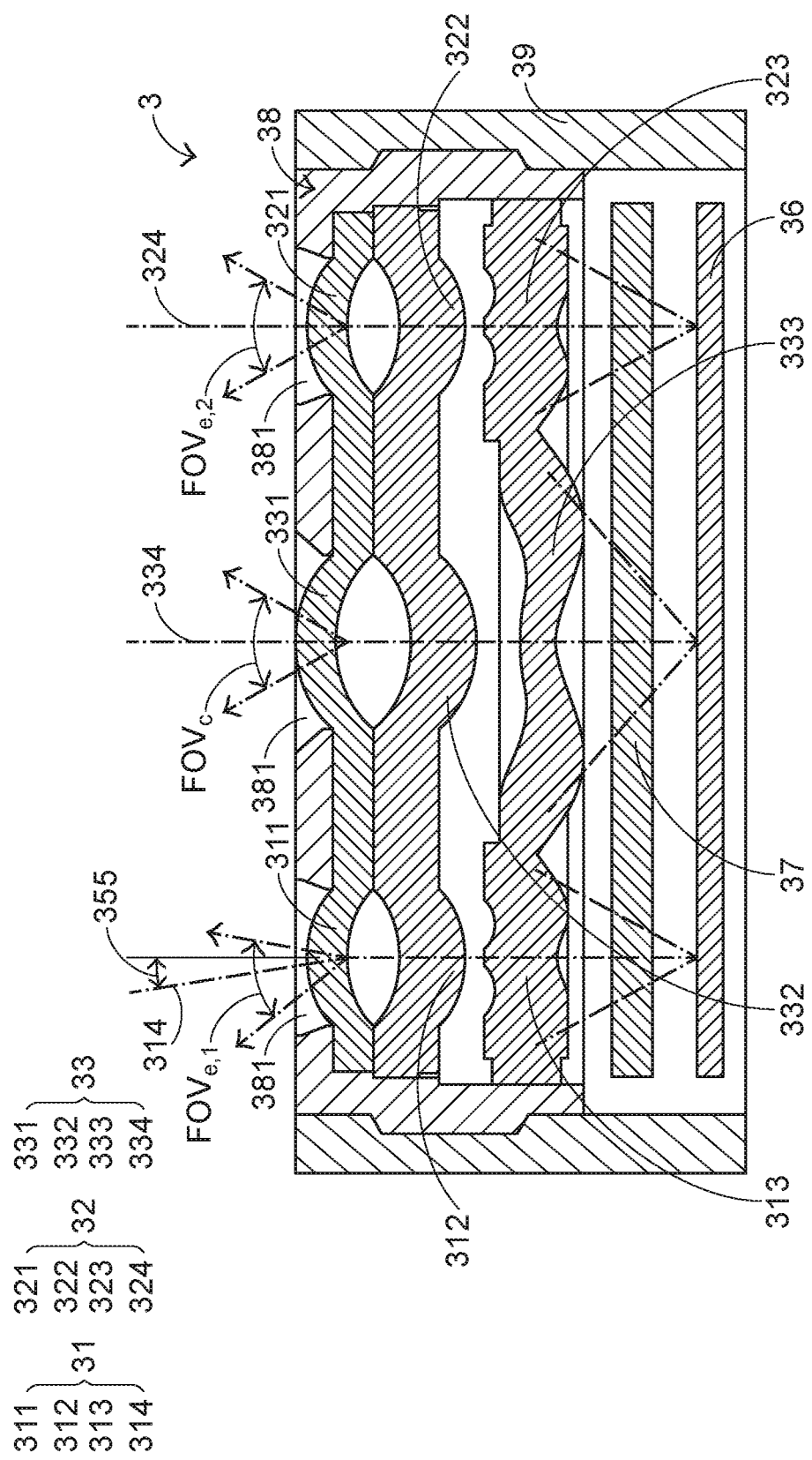
FIG. 5 is a schematic cross-sectional view illustrating a portion of the optical apparatus of FIG. 4 and taken along the line L-L.

FIG. 4 is a schematic perspective view illustrating the outer appearance of an exemplary optical apparatus, and the boresight viewing direction of each lens group, i.e., the corresponding optical axis, is plotted in FIG. 4. FIG. 5 is a schematic cross-sectional view illustrating a portion of the optical apparatus of FIG. 4 and taken along the line L-L, and the corresponding FOV is denoted in FIG. 5. Please refer to FIG. 4 and FIG. 5, the optical apparatus 3, such as an optical image capturing apparatus, includes a first optical lens group 31, a second optical lens group 32, a third optical lens group 33, a fourth optical lens group 34, a fifth optical lens group 35, an optical sensor 36, a filter 37, a light shielding plate 38 and a casing 39. The optical lens groups 31~35, the optical sensor 36, the filter 37 and the light shielding plate 38 are generally accommodated and fixed within the casing 39. Once the casing is with common cam curve and following the cam curve, a zoom, i.e., not fixed, lens may be achieved. Nevertheless, the traditional zoom is not the topic to be addressed here. It is a special consideration of zooming flexibility here, however. The zooming flexibility is embedded within more FOV available to lens groups (views). It should be noted that although it is the concept of field of view to be illustrated in this patent application, the field of view can be defined a specified area with a specified distance. Hence, the proposal of application here can be applied to the imaging of near-by object where FOV has to be modified.

The first optical lens group 31 is provided with a first lens 311, a fourth lens 312 and a seventh lens 313 that are sequentially arranged along the direction of a first optical axis 314. The second optical lens group 32 includes a second lens 321, a fifth lens 322 and an eighth lens 323 that are sequentially arranged along the direction of a second optical axis 324. The third optical lens group 33 is provided with a third lens 331, a sixth lens 332 and a ninth lens 333 that are sequentially arranged along the direction of a third optical axis 334. The fourth optical lens group 34 is provided with plural lenses (not shown) that are sequentially arranged along the direction of a fourth optical axis 344. The fifth optical lens group 35 includes plural lenses (not shown) that are sequentially arranged along the direction of a fifth optical axis 354. The arrangement sequences of the lenses of the fourth optical lens group 34 and fifth optical lens group 35 may be identical to or different from the ones of the first optical lens group 31, the second optical lens group 32 or the third optical lens group 33.

Generally, light beam incident onto a surface between two different transparent mediums will change the direction of the light beam because of refraction. Accordingly, when light beams pass through any of the optical lens groups 31~35, the travelling directions of the light beams are changed. After the light beams pass through any of the optical lens groups 31~35, the light beams are received by the optical sensor 36 and converted into an image signal by the optical sensor 36. The image signal is processed by a signal processor (not shown) or shown on a display device (not shown).

Furthermore, each lens aforementioned is made of plastic, glass or silicon-based material. As shown in FIG. 5, each of the first optical lens group 31, the second optical lens group 32 and the third optical lens group 33 includes plural lenses in a stack arrangement. Moreover, these optical lens groups 31~35 with these different optical axes 314, 324, 334, and 344 may perform different effective focal lengths. Next, a planar image sensor may be used as the optical sensor 36 and therefore the all images are on the same plane. It is noted that the number of lenses is not restricted. For example, in some embodiments, each of the optical lens groups 31~35 only includes a single lens.

Preferably, the first lens 311, the second lens 321, the third lens 331, the corresponding lens of the fourth optical lens group 34 and the corresponding lens of the fifth optical lens group 35 are connected with each other. That is, these lenses are integrally formed on a single transparent structure. Similarly, the fourth lens 312, the fifth lens 322, the sixth lens 332, the corresponding lens of the fourth optical lens group 34 and the corresponding lens of the fifth optical lens group 35 are connected with each other and integrally formed. Similarly, the seventh lens 313, the eighth lens 323, the ninth lens, the corresponding lens of the fourth optical lens group 34 and the corresponding lens of the fifth optical lens group 35 are connected with each other and integrally formed.

Since the corresponding lenses of the optical lens groups 31~35 are integrally formed with each other, the optical apparatus 3 can be assembled more easily. Moreover, since the optical apparatus 3 has the advantage of miniaturization, the optical apparatus 3 can be applied to a handheld mobile device such as a mobile phone, a tablet computer or any other wearable device.

Next, the light shielding plate 38 is located at the front sides of the optical lens groups 31~35. The light shielding plate 38 has plural perforations 381 corresponding to the optical lens groups 31~35 to expose the optical lens groups 31~35 for introducing the ambient light beams into the optical lens groups 31~35 and sheltering the surrounding stray light around the optical lens groups 31~35. Consequently, the optical resolution of the light beams to be sensed by the optical sensor 36 will be enhanced.

The filter 37 is arranged between the optical lens groups 31~35 and the optical sensor 36. After the light beams pass through the optical lens groups 31~35, portions of the light beams are filtered and sieved by the filter 37. Consequently, the light beams received by the optical sensor 36 are useful light beams. For example, according to the practical requirements, the filter 37 may block visible, infrared, near infrared and/or far infrared light beams.

In this embodiment, the third optical lens group 33 is a center optical lens group, and the first optical lens group 31, the second optical lens group 32, the fourth optical lens group 34 and the fifth optical lens group 35 are peripheral optical lens groups around the third optical lens group 33 of center optical lens group.

Furthermore, these optical lens groups 31~35 have respective effective focal lengths (EFL). Since the optical lens groups 31~35 may comprise different numbers and/or different optical properties of lenses, the effective focal lengths of any two optical lens groups are identical or different. In following formulas, $f_c$ is an effective focal length of the center optical lens group (i.e., the one of the third optical lens group 33), $f_{e,j}$ is an effective focal length of the j-th peripheral optical lens group (i.e., $f_{e,1}$ is the effective focal length of the first optical lens group 31, $f_{e,2}$ is the effective focal length of the second optical lens group 32, $f_{e,3}$ is the effective focal length of the fourth optical lens group 34, and $f_{e,4}$ is the effective focal length of the fifth optical lens group 35), and F/# is a f-number of the center optical lens group (i.e., the f-number of the third optical lens group 33). The optical apparatus 3 satisfies the following mathematic formulae:

$$0.6 < \frac{f_c}{f_{e,j}} < 1.2;$$

and $$\frac{f_c}{F/\#} < 2.5 \text{ (mm)};$$

That is, the quotient of the effective focal length of the third optical lens group 33 divided by the effective focal length of the first optical lens group 31, the second optical lens group 32, the fourth optical lens group 34 or the fifth optical lens group 35 is in the range between 0.6 and 1.2, and the quotient of the effective focal length of the third optical lens group 33 divided by the f-number of the third optical lens group 33 is smaller than 2.5. Consequently, the performance of converting the received light beam into the image signal by the optical sensor 36 will be enhanced.

Or, the optical apparatus 3 satisfies the following mathematic formulae:

$$0.6 < \frac{f_c}{f_{e,j}} < 1.2;$$

and $$\frac{f_c}{F/\#} < 1.1 \text{ (mm)}$$

That is, the quotient of the effective focal length of the third optical lens group 33 divided by the effective focal length of the first optical lens group 31, the second optical lens group 32, the fourth optical lens group 34 or the fifth optical lens group 35 is in the range between 0.6 and 1.2, and the quotient of the effective focal length of the third optical lens group 33 divided by the f-number of the third optical lens group 33 is smaller than 1.1.

Or, the optical apparatus 3 satisfies the following mathematic formulae:

$$0.2 < \frac{f_c}{f_{e,j}} < 2.0;$$

and $$\frac{f_c}{F/\#} < 1.1 \text{ (mm)}$$

That is, the quotient of the effective focal length of the third optical lens group 33 divided by the effective focal length of the first optical lens group 31, the second optical lens group 32, the fourth optical lens group 34 or the fifth optical lens group 35 is in the range between 0.2 and 2.0, and the quotient of the effective focal length of the third optical lens group 33 divided by the f-number of the third optical lens group 33 is smaller than 1.1. Consequently, the performance of converting the received light beam into the image signal by the optical sensor 36 will be enhanced.

Alternatively, these optical lens groups 31~35 have respective (in other words, specific) fields of view (FOV) if an object is specified at a far-away distance, or these optical lens groups 31~35 have a specified area of image to be taken at a specified distance. Since the optical lens groups 31~35 may be provided with different numbers and/or different optical properties of lenses, the FOVs of any two optical lens groups may be identical or different, as well as the direction of each optical axis and inclined angle 355 between two optical axes. In following formulae, $FOV_c$ is a FOV of the center optical lens group (i.e., the FOV of the third optical lens group 33), and $FOV_{e,j}$ is a FOV of the j-th peripheral optical lens group (i.e., $FOV_{e,1}$ is the FOV of the first optical lens group 31, $FOV_{e,2}$ is the FOV of the second optical lens group 32, $FOV_{e,3}$ is the FOV of the fourth optical lens group 34, and $FOV_{e,4}$ is the FOV of the fifth optical lens group 35). The optical apparatus 3 satisfies the following mathematic formula:

$$0.2 < \frac{FOV_{e,j}}{FOV_c} < 3$$

That is, the quotient of the FOV of the first optical lens group 31, the second optical lens group 32, the fourth optical lens group 34 or the fifth optical lens group 35 divided by the FOV of the third optical lens group 33 is in the range between 0.2 and 3. Consequently, the imaging performance of the optical apparatus 3 is enhanced. Preferably, when the central view is with typical FOV, e.g., 60-80 degrees. The associate FOV for the one peripheral optical lens group may be larger than 180 degrees for performing function of panoramic view. On the other hand, a minimum FOV of less 20 degrees or even 5 degrees is specially designed for far-field viewing with telescope application.

Preferably but not exclusively, the inclined angle 355 between the third optical axis 334 and each of the first optical axis 314, the second optical axis 324, the fourth optical axis 344 and the fifth optical axis 354, is smaller than 20 degrees. That is, the inclined angle 355 between the center optical lens group (or an axis parallel to the center optical lens group) and any peripheral optical lens group is smaller than 20 degrees. Consequently, the imaging performance of the optical apparatus 3 is enhanced.

In another embodiment, an inclined angle 355 between a center optical axis of the center optical lens group and a peripheral optical axis of at least one of the plural peripheral optical lens groups is more than 20 degrees when the corresponding optical lens groups are embedding with reflective optical elements 352 shown in FIG. 6.

Please refer to FIG. 6, the first optical lens group 31 includes a first reflective optical element 356, a second reflective optical element 352 and the seventh lens 313. Compared to the embodiment in FIG. 5, the first lens 311 and the fourth lens 312 are replaced by the first reflective optical element 356 and the second reflective optical element 352, and the first reflective optical element 356 and the second reflective optical element 352 are arranged at the positions where the first lens 311 and the fourth lens 312 occupy. Thus, the first reflective optical element 356 and the second reflective optical element 352 are deposited within the casing and behind the side of the light shielding plate 38. However, the first reflective optical element 356 and the second optical element 352 are still exposed by the bigger perforation of the light shielding plate 38 and arranged so as to receive ambient light beams into the first optical lens group 31.

In the case of the first optical lens group 31 including the first reflective optical element 356, the second reflective optical element 352 and the seventh lens 313, the optical axis of the first optical lens group 31 will pass through the centers of the curvatures of the first reflective optical element 356, the second reflective optical element 352 and the seventh lens 313. Thus, for the arrangement of the first reflective optical element 356 that is the most close to the top of the casing 39 to receive incident ambient light beams for the first optical lens group 31, the inclined angle 355 between the center optical axis of the center optical lens group (parallel to the optical axis 334) and the peripheral optical axis of the first optical lens group 31 that propagates from outside to the first reflective optical element 356 may be larger than 20 degrees. That ambient light beam is incident of the inclined angle 355 with respect to center optical axis 334 of the center optical lens group may be larger than 20 degrees to be received by the first optical lens group 31. In this embodiment, the ambient light beam of inclined angle 355 larger than 20 degrees may be reflected by the first reflective optical element 356 and the second reflective optical element 352, and then pass through the seventh lens 313 to be sensed by the optical sensor 36.

Accordingly, such a first optical lens group 31 may enlarge its FOV by the reflective optical elements. Furthermore, the seventh lens 313 may include a diffractive surface to modify the peripheral optical axis of the first optical lens group 31. In one embodiment, the first reflective optical element 356 is a reflective surface made or formed at a sidewall of the third lens 331 and the sixth lens 332. The second reflective optical element 352 is a reflective surface made of formed at a sidewall of the shielding plate 38 or/and the casing 39 and faced towards the first reflective optical element 356. However, either the first reflective optical element 356 or the second reflective optical element 352 may be reflective optical components fixed onto the sidewalls of the optical lens groups or the shielding plate 38 by any suitable way.

Optionally, one of the plural optical lens groups 31~35 is a visible optical lens group and another of the plural optical lens groups 31~35 is an invisible optical lens group. After a visible light beam passes through the visible optical lens group, a travelling direction of the visible light beam is changed. After an invisible light beam passes through the invisible optical lens group, a travelling direction of the invisible light beam is changed.

It is noted that some components mentioned in the above embodiment can be optionally omitted, such as the filter 37 or the light shielding plate 38. Besides, positions of some components may be adjusted, such as the light shielding plate 38 located at the front sides of the optical lens groups, arranged between two optical lens groups or arranged between two lenses of a specified optical lens group.

Alternatively, the optical apparatus may be provided with a single filter 37 or the plural filters 37 corresponding to the plural optical lens groups. Optionally, according to the special requirements, any two filters are designed to block the same kind of light beams or block different kinds of light beams.

From the above descriptions, the plural optical lens groups of the optical apparatus are designed for performing different optical functions, such as wide-angle, non-wide angle, long-distance and short-distance imaging function. It is noted that although the concept of field of view is used for illustration, the field of view can be defined to be a correspondingly specified area with a specified distance. Hence, the optical apparatus in above paragraphs can be applied to the imaging of near-by object where FOV has to be modified, and the optical lens groups are specified with FOV or specified by area with distance. Moreover, the plural optical lens groups are fixed in the same casing and share the same optical sensor. Consequently, the optical apparatus of the present invention is of a single optical lens module and able to implement different optical functions simultaneously. For example, the optical apparatus can acquire plural images corresponding to different optical functions in each capturing process. Accordingly, the overall volume of the optical apparatus is minimized, and the fabricating cost of the optical apparatus is reduced. Moreover, the process of assembling the optical apparatus is simplified, and the number of components to be assembled is reduced. In other words, the optical apparatus of the present invention is industrially applicable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical image capturing apparatus, comprising:
   plural peripheral optical lens groups with plural peripheral optical axes, respectively, wherein at least one of the plural peripheral optical lens groups includes a first reflective optical element, a second reflective optical element and a first peripheral lens;
   a center optical lens group with a center optical axis positioned to be surrounded by the plural peripheral optical lens groups, wherein the center optical lens group includes plural center lenses in a stack arrangement, and the first reflective optical element is located at a sidewall of the plural center lenses and the first peripheral lens is integrally formed with one of the center lenses, and the center optical axis and at least one of the plural peripheral optical axes are not overlapped with each other;
   an optical sensor arranged to sense an ambient light beam passing through the plural peripheral optical lens groups and the center optical lens group; and
   a casing accommodating the plural peripheral optical lens groups, the center optical lens group and the optical sensor, wherein the second reflective optical element is located at an interior sidewall of the casing and faced towards the first reflective optical element,
   wherein the ambient light beam having an inclined angle larger than 20 degrees with respect to the center optical axis is reflected by the first reflective optical element and the second reflective optical element and then passes through the first peripheral lens to be sensed by the optical sensor.

2. The optical image capturing apparatus according to claim 1, further comprising a filter arranged between the plural peripheral optical lens groups, the center optical lens group and the optical sensor, wherein a visible light beam, an infrared light beam, a near infrared light beam and/or a far infrared light beam is blocked by the filter.

3. The optical image capturing apparatus according to claim 1, further comprising a light shielding plate located at front sides of the plural peripheral optical lens groups and the center optical lens group and accommodated within the casing, wherein the light shielding plate includes plural perforations corresponding to the plural peripheral optical lens groups and the center optical lens group, respectively.

4. The optical image capturing apparatus according to claim 1, wherein, exclusive of the one having the first and second reflective optical elements and the first peripheral lens, each of the plural peripheral optical lens groups comprises plural other peripheral lenses arranged in a stack arrangement and integrally formed with the plural center lenses.

5. The optical image capturing apparatus according to claim 1, wherein the optical image capturing apparatus satisfies a mathematic formula:

$$0.2 < \frac{FOV_{e,j}}{FOV_c} < 3$$

wherein $FOV_c$ is a field of view of the center optical lens group, and $FOV_{e,j}$ is a field of view of a j-th peripheral optical lens group.

6. The optical image capturing apparatus according to claim 1, wherein the optical image capturing apparatus satisfies mathematic formulae:

$$0.6 < \frac{f_c}{f_{e,j}} < 1.2;$$

and $$\frac{f_c}{F/\#} < 2.5 \text{ (mm)}$$

wherein $f_c$ is an effective focal length of the center optical lens group, $f_{e,j}$ is an effective focal length of a j-th peripheral optical lens group, and F/# is a f-number of the center optical lens group.

7. The optical image capturing apparatus according to claim 1, wherein the optical image capturing apparatus satisfies mathematic formulae:

$$0.6 < \frac{f_c}{f_{e,j}} < 1.2;$$

and $$\frac{f_c}{F/\#} < 1.1 \text{ (mm)}$$

wherein $f_c$ is an effective focal length of the center optical lens group, $f_{e,j}$ is an effective focal length of a j-th peripheral optical lens group, and F/# is a f-number of the center optical lens group.

8. The optical image capturing apparatus according to claim 1, wherein the optical image capturing apparatus satisfies mathematic formulae:

$$0.2 < \frac{f_c}{f_{e,j}} < 2.0;$$

-continued and $$\frac{f_c}{F/\#} < 1.1 \text{ (mm)}$$

wherein $f_c$ is an effective focal length of the center optical lens group, $f_{e,j}$ is an effective focal length of a j-th peripheral optical lens group, and F/# is a f-number of the center optical lens group.

9. The optical apparatus according to claim 1, further comprising at least one filter, wherein the at least one filter is arranged between the plural optical lens groups and the optical sensor, wherein after the light beam passes through any of the plural optical lens groups, a portion of the light beam is filtered and sieved by the filter.

* * * * *